US008650634B2

(12) United States Patent
Bajekal

(10) Patent No.: US 8,650,634 B2
(45) Date of Patent: Feb. 11, 2014

(54) ENABLING ACCESS TO A SUBSET OF DATA

(75) Inventor: Sadanand Rajaram Bajekal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 12/353,329

(22) Filed: Jan. 14, 2009

(65) Prior Publication Data
US 2010/0180337 A1 Jul. 15, 2010

(51) Int. Cl.
*G06F 21/00* (2013.01)

(52) U.S. Cl.
USPC .............................................. 726/17; 707/770

(58) Field of Classification Search
USPC ........................................... 726/19; 707/770
See application file for complete search history.

(56) References Cited

U.S. PATENT DOCUMENTS

| 3,873,769 A | 3/1975 | Cotter |
| 4,393,410 A | 7/1983 | Ridge et al. |
| 4,538,182 A | 8/1985 | Saito et al. |
| 4,577,058 A | 3/1986 | Collins |
| 4,687,317 A | 8/1987 | Appel et al. |
| 4,751,583 A | 6/1988 | Levine |
| 4,771,336 A | 9/1988 | Ohtorii |
| 4,987,497 A | 1/1991 | Yoshimura |
| 5,075,787 A | 12/1991 | Shaughnessy et al. |
| 5,103,490 A | 4/1992 | McMillin |
| 5,259,041 A | 11/1993 | Kato et al. |
| 5,465,155 A | 11/1995 | Edgar |
| 5,486,166 A | 1/1996 | Bishop et al. |
| 5,574,577 A | 11/1996 | Wally, Jr. et al. |
| 5,630,168 A | 5/1997 | Rosebrugh et al. |
| 5,781,668 A | 7/1998 | Starkweather |
| 5,838,326 A | 11/1998 | Card et al. |
| 6,014,662 A | 1/2000 | Moran et al. |
| 6,373,602 B1 | 4/2002 | Kohler et al. |
| 6,493,115 B1 | 12/2002 | Kanno et al. |
| 6,561,422 B1 | 5/2003 | Cariffe |
| 6,561,678 B2 | 5/2003 | Loughrey |

(Continued)

FOREIGN PATENT DOCUMENTS

| DE | 19804028 | 8/1998 |
| EP | 0450196 | 10/1991 |

(Continued)

OTHER PUBLICATIONS

USPTO final office action dated Jan. 20, 2012 regarding U.S. Appl. No. 11/868,216, 13 Pages.

(Continued)

*Primary Examiner* — Kambiz Zand
*Assistant Examiner* — Ali Shayanfar
(74) *Attorney, Agent, or Firm* — Yee & Associates, P.C.; Jeffrey S. LaBaw

(57) ABSTRACT

A method includes receiving, at a computing device, one or more replicated authorization databases. At least one of the one or more replicated authorization databases corresponds to a subscription to access selected data. The selected data is aggregated from a plurality of sources. The method also includes storing the one or more replicated authorization databases at the computing device. The method also includes determining, via the replicated authorization databases, user permission to access the selected data via the computing device. The method also includes enabling access to the selected data at the computing device after determining the user permission to access the selected data.

13 Claims, 7 Drawing Sheets

(56) References Cited

U.S. PATENT DOCUMENTS

| | | |
|---|---|---|
| 6,571,279 B1 | 5/2003 | Herz et al. |
| 6,581,104 B1 | 6/2003 | Bereiter |
| 6,636,831 B1 | 10/2003 | Profit, Jr. et al. |
| 6,646,765 B1 | 11/2003 | Barker et al. |
| 6,708,176 B2 | 3/2004 | Strunk et al. |
| 6,751,780 B1 | 6/2004 | Neff et al. |
| 6,753,981 B1 | 6/2004 | Park |
| 6,781,688 B2 | 8/2004 | Kren et al. |
| 6,806,636 B2 | 10/2004 | Kang et al. |
| 6,839,669 B1 | 1/2005 | Gould et al. |
| 6,850,252 B1 | 2/2005 | Hoffberg |
| 6,894,715 B2 | 5/2005 | Henrikson |
| 6,915,626 B2 | 7/2005 | Carton |
| 6,924,741 B2 | 8/2005 | Tamayama et al. |
| 6,938,203 B1 | 8/2005 | Dimarco et al. |
| 6,970,607 B2 | 11/2005 | Jia et al. |
| 6,970,821 B1 | 11/2005 | Shambaugh et al. |
| 6,981,649 B2 | 1/2006 | Jaeger et al. |
| 6,999,932 B1 | 2/2006 | Zhou |
| 7,002,712 B2 | 2/2006 | Barker et al. |
| 7,035,804 B2 | 4/2006 | Saindon et al. |
| 7,079,293 B2 | 7/2006 | Risheq |
| 7,148,998 B2 | 12/2006 | Baggs et al. |
| 7,174,056 B2 | 2/2007 | Silverbrook et al. |
| 7,177,931 B2 | 2/2007 | Athey et al. |
| 7,194,217 B2 | 3/2007 | Hosoi |
| 7,200,280 B2 | 4/2007 | Enomoto |
| 7,200,576 B2 | 4/2007 | Steeves et al. |
| 7,209,124 B2 | 4/2007 | Hunt et al. |
| 7,236,653 B2 | 6/2007 | Constantin et al. |
| 7,257,531 B2 | 8/2007 | Holub |
| 7,290,950 B2 | 11/2007 | Donahoe et al. |
| 7,373,590 B2 | 5/2008 | Woolf et al. |
| 7,383,307 B2 | 6/2008 | Kirkland et al. |
| 7,401,297 B2 | 7/2008 | Hori et al. |
| 7,441,706 B1 | 10/2008 | Schuessler et al. |
| 7,450,086 B2 | 11/2008 | Thielman et al. |
| 7,457,012 B2 | 11/2008 | Fang |
| 7,466,873 B2 | 12/2008 | Eschbach et al. |
| 7,475,110 B2 | 1/2009 | Kirkland et al. |
| 7,493,566 B2 | 2/2009 | Nakajima et al. |
| 7,519,222 B2 | 4/2009 | Kisilev et al. |
| 7,533,349 B2 | 5/2009 | Saul et al. |
| 7,565,330 B2 | 7/2009 | Steeves et al. |
| 7,567,908 B2 | 7/2009 | Bodin et al. |
| 7,577,295 B2 | 8/2009 | Constantin et al. |
| 7,599,517 B2 | 10/2009 | Kogure et al. |
| 7,649,525 B2 | 1/2010 | Chen et al. |
| 7,710,391 B2 | 5/2010 | Bell et al. |
| 7,742,197 B2 | 6/2010 | Takiyama et al. |
| 7,743,348 B2 | 6/2010 | Robbins et al. |
| 7,765,229 B2 * | 7/2010 | Samji et al. ............... 707/770 |
| 7,784,087 B2 | 8/2010 | Yami et al. |
| 7,817,297 B2 | 10/2010 | Ushida et al. |
| 7,830,408 B2 | 11/2010 | Asthana et al. |
| 7,856,477 B2 | 12/2010 | Libbey et al. |
| 7,870,493 B2 | 1/2011 | Pall et al. |
| 7,877,707 B2 | 1/2011 | Westerman et al. |
| 7,911,453 B2 | 3/2011 | Wilson et al. |
| 7,916,946 B2 | 3/2011 | Hanano |
| 7,924,477 B1 | 4/2011 | Malzbender et al. |
| 7,929,805 B2 | 4/2011 | Wang et al. |
| 7,937,319 B2 | 5/2011 | Kennis et al. |
| 7,970,870 B2 | 6/2011 | Hinckley et al. |
| 7,975,065 B2 | 7/2011 | Dunning et al. |
| 8,009,147 B2 | 8/2011 | Chang et al. |
| 8,019,127 B2 | 9/2011 | Misra |
| 8,022,941 B2 | 9/2011 | Smoot |
| 8,023,766 B1 | 9/2011 | Bergman et al. |
| 8,063,888 B2 | 11/2011 | McFarlane et al. |
| 8,085,323 B2 | 12/2011 | Tanaka et al. |
| 8,094,129 B2 | 1/2012 | Izadi et al. |
| 8,102,575 B2 | 1/2012 | Hattori |
| 8,139,036 B2 | 3/2012 | Do et al. |
| 2002/0031282 A1 | 3/2002 | Ideyama |
| 2002/0178190 A1 | 11/2002 | Pope et al. |
| 2002/0191072 A1 | 12/2002 | Henrikson |
| 2003/0066073 A1 | 4/2003 | Rebh |
| 2003/0078840 A1 | 4/2003 | Strunk et al. |
| 2003/0126162 A1 * | 7/2003 | Yohe et al. ............... 707/201 |
| 2003/0142135 A1 | 7/2003 | Hori et al. |
| 2003/0160862 A1 | 8/2003 | Charlier et al. |
| 2003/0204403 A1 | 10/2003 | Browning |
| 2003/0208598 A1 * | 11/2003 | Athey et al. ............... 709/226 |
| 2003/0231801 A1 | 12/2003 | Baggs et al. |
| 2004/0004733 A1 | 1/2004 | Barker et al. |
| 2004/0019482 A1 | 1/2004 | Holub |
| 2004/0020187 A1 | 2/2004 | Carton |
| 2004/0051644 A1 | 3/2004 | Tamayama et al. |
| 2004/0130750 A1 | 7/2004 | Ushida et al. |
| 2004/0139391 A1 | 7/2004 | Stumbo et al. |
| 2004/0190772 A1 | 9/2004 | Constantin et al. |
| 2004/0196503 A1 | 10/2004 | Kurtenbach et al. |
| 2004/0199597 A1 | 10/2004 | Libbey et al. |
| 2004/0201871 A1 | 10/2004 | Risheq |
| 2004/0224674 A1 * | 11/2004 | O'Farrell et al. ............ 455/418 |
| 2004/0237033 A1 | 11/2004 | Woolf et al. |
| 2005/0110964 A1 | 5/2005 | Bell et al. |
| 2005/0111894 A1 | 5/2005 | Hosoi |
| 2005/0149364 A1 | 7/2005 | Ombrellaro |
| 2005/0149620 A1 | 7/2005 | Kirkland et al. |
| 2005/0149621 A1 | 7/2005 | Kirkland et al. |
| 2005/0154595 A1 | 7/2005 | Bodin et al. |
| 2005/0182680 A1 | 8/2005 | Jones, III et al. |
| 2005/0183023 A1 | 8/2005 | Maruyama et al. |
| 2005/0231767 A1 | 10/2005 | Brake et al. |
| 2006/0001650 A1 | 1/2006 | Robbins et al. |
| 2006/0019748 A1 | 1/2006 | Aikawa |
| 2006/0036944 A1 | 2/2006 | Wilson |
| 2006/0048224 A1 | 3/2006 | Duncan |
| 2006/0073891 A1 | 4/2006 | Holt |
| 2006/0117669 A1 | 6/2006 | Baloga et al. |
| 2006/0126128 A1 | 6/2006 | Ahmed et al. |
| 2006/0132501 A1 | 6/2006 | Nonaka et al. |
| 2006/0146034 A1 | 7/2006 | Chen et al. |
| 2006/0158703 A1 | 7/2006 | Kisilev et al. |
| 2006/0176524 A1 | 8/2006 | Willrich |
| 2006/0203208 A1 | 9/2006 | Thielman et al. |
| 2006/0204030 A1 | 9/2006 | Kogure et al. |
| 2006/0209363 A1 | 9/2006 | Suenaga et al. |
| 2006/0212486 A1 | 9/2006 | Kennis |
| 2006/0267966 A1 | 11/2006 | Grossman et al. |
| 2006/0287963 A1 | 12/2006 | Steeves et al. |
| 2006/0294247 A1 | 12/2006 | Hinckley et al. |
| 2007/0005500 A1 | 1/2007 | Steeves et al. |
| 2007/0026372 A1 | 2/2007 | Huelsbergen |
| 2007/0033637 A1 | 2/2007 | Yami et al. |
| 2007/0055929 A1 | 3/2007 | Giannetti et al. |
| 2007/0079249 A1 | 4/2007 | Pall et al. |
| 2007/0083666 A1 | 4/2007 | Apelbaum |
| 2007/0143103 A1 | 6/2007 | Asthana et al. |
| 2007/0143624 A1 | 6/2007 | Steeves |
| 2007/0143690 A1 | 6/2007 | Nakajima et al. |
| 2007/0156811 A1 | 7/2007 | Jain et al. |
| 2007/0201745 A1 | 8/2007 | Wang et al. |
| 2007/0220444 A1 | 9/2007 | Sunday et al. |
| 2007/0239471 A1 | 10/2007 | Patton |
| 2007/0288599 A1 | 12/2007 | Saul et al. |
| 2008/0019746 A1 | 1/2008 | Takiyama et al. |
| 2008/0028321 A1 | 1/2008 | Weksler et al. |
| 2008/0052319 A1 * | 2/2008 | Dunning et al. ........... 707/104.1 |
| 2008/0066014 A1 | 3/2008 | Misra |
| 2008/0088593 A1 | 4/2008 | Smoot |
| 2008/0122803 A1 | 5/2008 | Izadi et al. |
| 2008/0127302 A1 | 5/2008 | Qvarfordt et al. |
| 2008/0131946 A1 | 6/2008 | Pichersky et al. |
| 2008/0137157 A1 | 6/2008 | Bannai |
| 2008/0168403 A1 | 7/2008 | Westerman et al. |
| 2008/0192059 A1 | 8/2008 | Kennedy |
| 2008/0198138 A1 | 8/2008 | McFarlane et al. |
| 2008/0214233 A1 | 9/2008 | Wilson et al. |
| 2008/0270230 A1 | 10/2008 | Hendrickson et al. |
| 2008/0281851 A1 | 11/2008 | Izadi et al. |
| 2008/0288862 A1 | 11/2008 | Smetters et al. |

(56) References Cited

U.S. PATENT DOCUMENTS

| | | |
|---|---|---|
| 2009/0002327 A1 | 1/2009 | Wilson et al. |
| 2009/0003649 A1 | 1/2009 | Wakabayashi |
| 2009/0085877 A1 | 4/2009 | Chang et al. |
| 2009/0091529 A1 | 4/2009 | Do et al. |
| 2009/0091539 A1 | 4/2009 | Do et al. |
| 2009/0091555 A1 | 4/2009 | Do et al. |
| 2009/0094515 A1 | 4/2009 | Do et al. |
| 2009/0094561 A1 | 4/2009 | Do et al. |
| 2009/0113294 A1 | 4/2009 | Sanghavi et al. |
| 2009/0138723 A1 | 5/2009 | Nyang et al. |
| 2009/0150983 A1 | 6/2009 | Saxena et al. |
| 2009/0150986 A1 | 6/2009 | Foreman |
| 2009/0232409 A1 | 9/2009 | Marchesotti |
| 2009/0262380 A1 | 10/2009 | Puigardeu et al. |
| 2009/0328163 A1 | 12/2009 | Preece |
| 2010/0020365 A1 | 1/2010 | Do et al. |
| 2010/0189345 A1 | 7/2010 | Reddy et al. |
| 2011/0066573 A1 | 3/2011 | Fijnvandraat |
| 2011/0069357 A1 | 3/2011 | Austin et al. |
| 2011/0122432 A1 | 5/2011 | Do et al. |
| 2011/0122458 A1 | 5/2011 | Do et al. |
| 2011/0122459 A1 | 5/2011 | Do et al. |

FOREIGN PATENT DOCUMENTS

| | | |
|---|---|---|
| EP | 0543566 | 5/1993 |
| EP | 1315071 | 5/2003 |
| EP | 1621989 | 2/2006 |
| JP | 62066280 A | 3/1987 |
| JP | 62122459 | 6/1987 |
| JP | 62266964 | 11/1987 |
| JP | 63182770 | 7/1988 |
| JP | 2000148396 | 5/2000 |
| JP | 2006139615 | 6/2006 |
| JP | 2007148820 | 6/2007 |
| JP | 2007265149 | 10/2007 |
| JP | 2008180260 | 8/2008 |
| WO | WO0101391 | 1/2001 |
| WO | WO03036415 | 5/2003 |
| WO | WO2004068421 | 8/2004 |
| WO | WO 2005/052720 | 6/2005 |

OTHER PUBLICATIONS

USPTO final office action dated Mar. 3, 2011 regarding U.S. Appl. No. 11/868,216, 143 Pages.
USPTO non-final office action dated Aug. 20, 2010 regarding U.S. Appl. No. 11/868,216, 11 Pages.
USPTO non-final office action dated Aug. 3, 2011 regarding U.S. Appl. No. 11/868,216, 11 Pages.
USPTO non-final office action dated Dec. 16, 2011 regarding U.S. Appl. No. 12/178,294, 7 Pages.
USPTO non-final office action dated Jun. 9, 2011 regarding U.S. Appl. No. 12/18,294, 12 Pages.
USPTO final office action dated Dec. 10, 2010 regarding U.S. Appl. No. 11/869,313, 22 Pages.
USPTO final office action dated May 24, 2011 regarding U.S. Appl. No. 11/869,313, 18 Pages.
USPTO non-final office action dated Jan. 28, 2011 regarding U.S. Appl. No. 11/869,313, 12 Pages.
USPTO non-final office action dated Aug. 15, 2010 regarding U.S. Appl. No. 11/869,313, 17 Pages.
USPTO final office action dated Oct. 18, 2011 regarding U.S. Appl. No. 11/868,474, 17 Pages.
USPTO final office action dated Mar. 1, 2011 regarding U.S. Appl. No. 11/868,474, 18 Pages.
USPTO non-final office action dated Oct. 29, 2010 regarding U.S. Appl. No. 11/868,474, 19 Pages.
USPTO non-final office action dated Jun. 23, 2011 regarding U.S. Appl. No. 11/868,474, 16 Pages.
USPTO final office action dated Apr. 15, 2011 regarding U.S. Appl. No. 11/868,513, 11 Pages.
USPTO non-final office action dated Jul. 28, 2011 regarding U.S. Appl. No. 11/868,513, 12 Pages.
USPTO notice of allowance dated Dec. 5, 2011 regarding U.S. Appl. No. 11/868,513, 13 Pages.
USPTO non-final office action dated Dec. 10, 2010 regarding U.S. Appl. No. 11/868,513, 17 Pages.
USPTO non-final office action dated Aug. 6, 2010 regarding U.S. Appl. No. 11/868,513, 19 Pages.
USPTO non-final office action dated Feb. 9, 2012 regarding U.S. Appl. No. 12/624,735, 35 Pages.
USPTO notice of allowance dated Aug. 24, 2012 regarding U.S. Appl. No. 12/624,735, 19 Pages.
USPTO non-final office action dated Jul. 23, 2012 regarding U.S. Appl. No. 12/624,753, 34 Pages.
USPTO non-final office action dated Feb. 18, 2012 regarding U.S. Appl. No. 12/624,753, 17 Pages.
USPTO final office action dated Jun. 20, 2012 regarding U.S. Appl. No. 12/624,763, 58 Pages.
USPTO non-final office action dated Feb. 16, 2012 regarding U.S. Appl. No. 12/624,763, 34 Pages.
USPTO final office action dated Dec. 9, 2010 regarding U.S. Appl. No. 11/868,766, 18 Pages.
USPTO final office action dated Aug. 4, 2011 regarding U.S. Appl. No. 11/868,766, 15 Pages.
USPTO non-final office action dated Aug. 6, 2010 regarding U.S. Appl. No. 11/868,766, 18 Pages.
USPTO non-final office action dated Apr. 14, 2011 regarding U.S. Appl. No. 11/868,766, 14 Pages.
USPTO final office action dated Feb. 18, 2011 regarding U.S. Appl. No. 11/950,872, 18 Pages.
USPTO non-final office action dated Oct. 15, 2010 regarding U.S. Appl. No. 11/950,872, 10 Pages.
USPTO notice of allowance dated May 16, 2011 regarding U.S. Appl. No. 11/869,987, 7 Pages.
USPTO non-final office action dated Nov. 30, 2010 regarding U.S. Appl. No. 11/869,098, 8 Pages.
Ashdown et al., "Escritoire: A Personal Projected Display", IEEE Multimedia, vol. 12, Issue 1, Jan.-Mar. 2005, pp. 34-42.
Athanasopouloos et al., "Enhanced CAPTCHAs: Using Animation to tell Humans and Computers Apart," Communications and Multimedia Security LNCS, Oct. 2006, vol. 4237, pp. 97-108.
Augsten et al., "Multitoe: High Precision Interaction with Back-Projected Floors Based on High-Resolution Multi-Touch Input," UIST '10 Proceedings of the 23nd annual ACM symposium on User interface software and technology, Oct. 2010, 10 Pages.
Bohte et al., "Market-Based Recommendation: Agents that Compete for Consumer Attention", ACM Transactions on Internet Technology, vol. 4, No. 4, Nov. 2004, 29 Pages.
Bollacker et al., "A System for Automatic Personalized Tracking of Scientific Literature on the Web," Proceedings of the Fourth ACM Conference on Digital Libraries, Aug. 1999, pp. 105-113.
Gabriel et al., "Conscientious Software", ACM 1-59593-348-4/06/0010, Sun Microsystems, Inc., Oct. 2006, 18 Pages.
Gronbaek et al., "iGameFloor—A Platform for Co-Located Collaborative Games," Proceedings of the international Conference on Advances in Computer Entertainment Technology, ACE '07, Jun. 2007, vol. 203, pp. 1-8.
Izadi et al., "Dynamo: A public interactive surface supporting cooperative sharing and exchange of media", UIST 2003 Proceedings of the 16th annual ACM symposium on User interface software and technology, Chi Letters, vol. 5, Iss. 2, Nov. 2003, pp. 159-168.
Jagadish et al., "Making Database Systems Usable", SIGMOD '07, ACM 978-1-59593-686-8/07/0006, Mar. 2002, vol. 34, No. 1, 12 Pages.
Lemon et al., "Multithreaded Context for Robust Conversational Interfaces: Context-Sensitive Speech Recognition and Interpretation of Corrective Fragments", ACM Transactions on Computer-Human Interaction, Sep. 2004, vol. 11, No. 3, 27 Pages.
Marshall et al., "Exploring The Relationship Between Personal and Public Annotations", Proceedings of the 4th ACM/IEEE-CS Joint Conference on Digital Libraries (JCDL '04), Jun. 2004, 9 Pages.

(56) References Cited

OTHER PUBLICATIONS

McTear, "Spoken Dialogue Technology: Enabling the Conversational User Interface", ACM Computing Surveys, vol. 34, No. 1, Mar. 2002, 97 Pages.
Microsoft: "Microsoft Launches New Product Category: Surface Computing Comes to Life in Restaurants, Hotels, Retail Locations and Casino Resorts", Microsoft News Center, Microsoft Website, May 2007, 3 Pages.
PCT search report dated Jan. 29, 2009 regarding application PCT/EP2008063005, 3 Pages.
PCT search report dated Dec. 29, 2008 regarding application PCT/EP2008063007, 2 Pages.
PCT search report dated Feb. 5, 2009 regarding application PCT/EP2008063006, 3 Pages.
Notice of allowance dated Jan. 24, 2013 regarding U.S. Appl. No. 12/178,294, 17 pages.
Notice of allowance dated Jan. 4, 2013 regarding U.S. Appl. No. 12/624,735, 16 pages.
Final office action dated Jan. 18, 2013 regarding U.S. Appl. No. 12/624,753, 21 pages.

* cited by examiner

ENABLING ACCESS TO A SUBSET OF DATA

FIELD

The present disclosure is generally related to enabling access to a subset of data.

BACKGROUND

Data providers, such as Bloomberg and Reuters-Thomson, aggregate data related to a particular industry from different sources and offer access to a subset of the data via a subscription. For example, the aggregated data may include financial market data, legal data, health care data, technology data, science data, and government data. To illustrate, a subscription to financial market data may include streaming real-time quotes for all securities listed on the New York Stock Exchange (NYSE). For financial market data, access to the data may be provided using a specialized computer terminal, such as a Bloomberg terminal or a Reuters terminal, to enable access to a subset of the financial market data via the subscription. When a financial trader attempts to access the financial market data, the terminal may determine whether the financial trader has a subscription that enables the financial trader to access the financial market data and then allows or denies access to the financial market data accordingly.

The subscription information is typically managed by the data provider. One way the terminal can determine whether the financial trader has a subscription to access a portion of the financial market data is for the terminal to send a request to the data provider asking whether the financial trader has a subscription to access the financial market data and then allow or deny access to the financial market data accordingly. However, the exchange of messages between the terminal and the data provider may result in a delay before the financial trader is allowed to access the requested financial market data. In addition, the work load for the data provider increases because the data provider is repeatedly checking whether each financial trader can access a particular portion of the financial market data.

Another way to determine whether the financial trader has a subscription to access a portion of the financial data is to create a local copy of the master authorization database at each terminal. However, copying a large master authorization database to many terminals takes time and results in the master authorization database occupying a large portion of memory at the terminal. In addition, each time a trader changes his or her subscription, or the data provider offers new or updated packaged financial-products, the trader cannot access the financial market data associated with the new subscription until the master authorization database with the new subscription information is copied to the trader's terminal.

BRIEF SUMMARY

In a particular embodiment, a method includes receiving, at a computing device, one or more replicated authorization databases. At least one of the one or more replicated authorization databases corresponds to a subscription to access selected data. The selected data is aggregated from a plurality of sources. At least a portion of the selected data is real-time subscription data. The method also includes storing the one or more replicated authorization databases at the computing device. The method also includes determining, via the replicated authorization databases, user permission to access the selected data via the computing device. The method also includes enabling access to the selected data at the computing device after determining the user permission to access the selected data.

In another particular embodiment, a method includes partitioning an ontology data structure having multiple domains to create a set of authorization databases. Each of the authorization databases is associated with a user subscription type. The method also includes identifying, based at least partially on a first user profile, entitlement rights of a first user to access a subset of data, the data aggregated from a plurality of sources. At least a portion of the data is aggregated substantially in real-time. The method also includes identifying a first subset of authorization databases. The first subset of authorization databases includes at least one but not all databases in the set of authorization databases. The first subset of authorization databases is selected based on a subscription associated with the first user. The first subset of authorization databases includes permissions to access the subset of data. The method also includes selectively replicating the first subset of authorization databases to a first computing device associated with the first user.

In another particular embodiment, a system includes a network interface to communicate with a remote computing device via a network. The network interface is configured to receive a login notification from a computing device associated with a user. The system also includes a directory services server including user information associated with entitlements of each of a plurality of users to access a subset of data, where the user information includes a user profile. The system also includes a policy server coupled to the directory services server. The policy server includes a set of policies useable to determine entitlements for a particular user based on a user profile of the particular user. The policy server further identifies a subset of authorization databases from a set of authorization databases based on the entitlements. The system also includes an access manager to replicate the subset of authorization databases to the remote computing device to enable user access of the particular user to the subset of data.

In another particular embodiment, a computer program product including a computer usable medium having computer usable program code is disclosed. The computer usable program code is configured to identify entitlements of a user to access selected data. The computer usable program code is further configured to identify one or more authorization databases from a set of authorization databases based on the entitlements of the user. The computer usable program code is further configured to replicate the one or more authorization databases to a computing device associated with the user.

DETAILED DESCRIPTION

Figure 1:
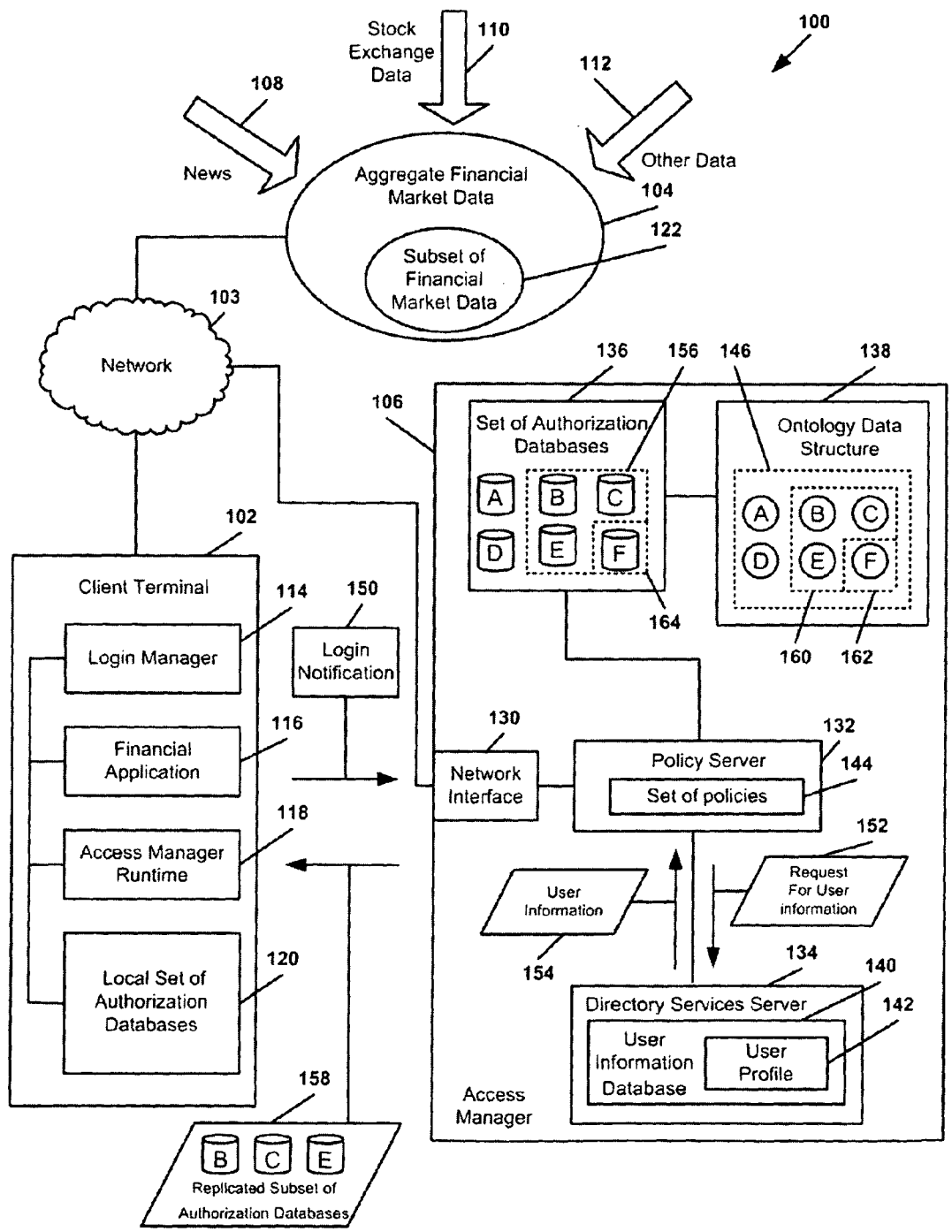
FIG. 1 is a block diagram of a first embodiment of a system to enable access to a subset of data.
Figure 2:
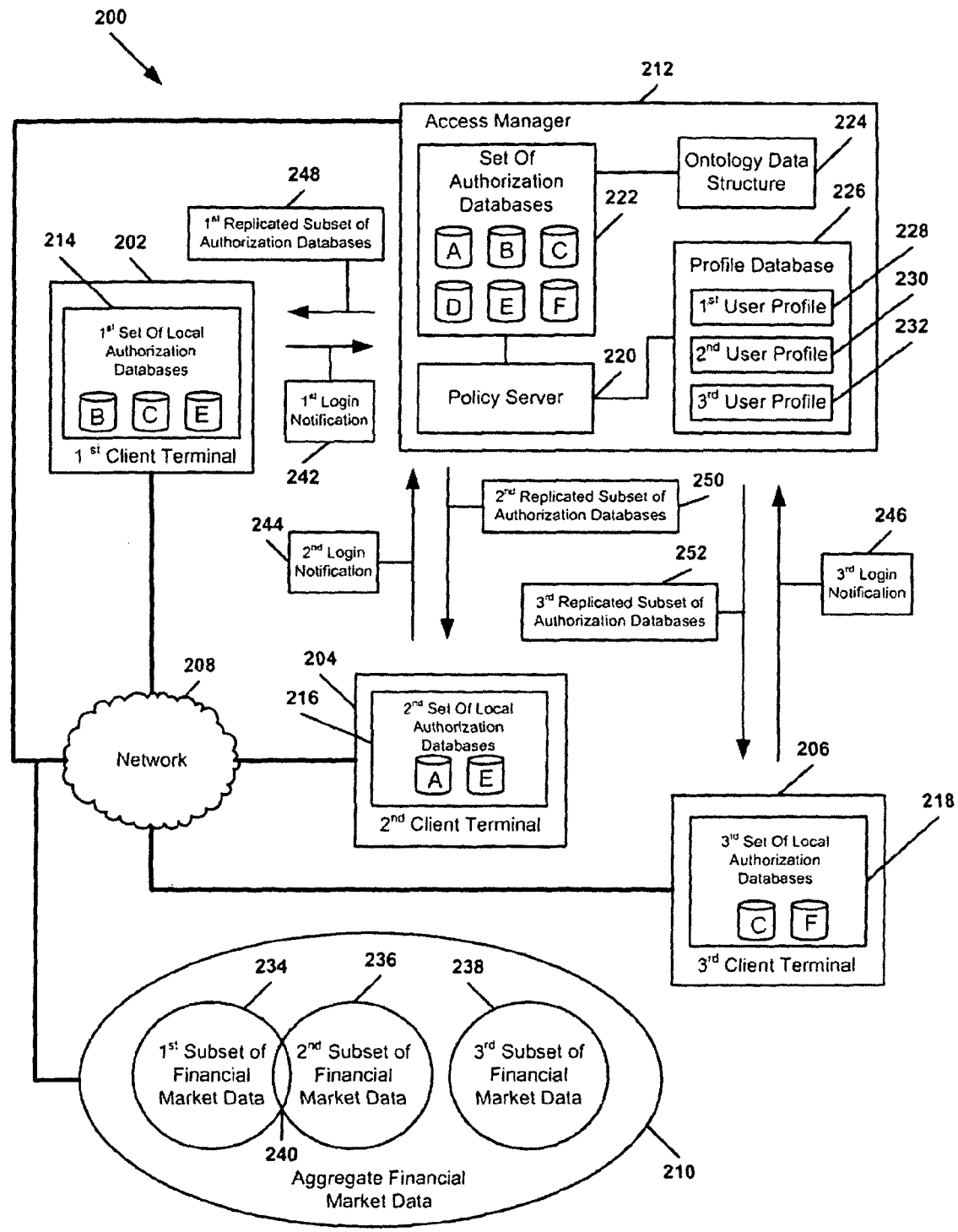
FIG. 2 is a block diagram of a second embodiment of a system to enable access to a subset of data.
Figure 3:
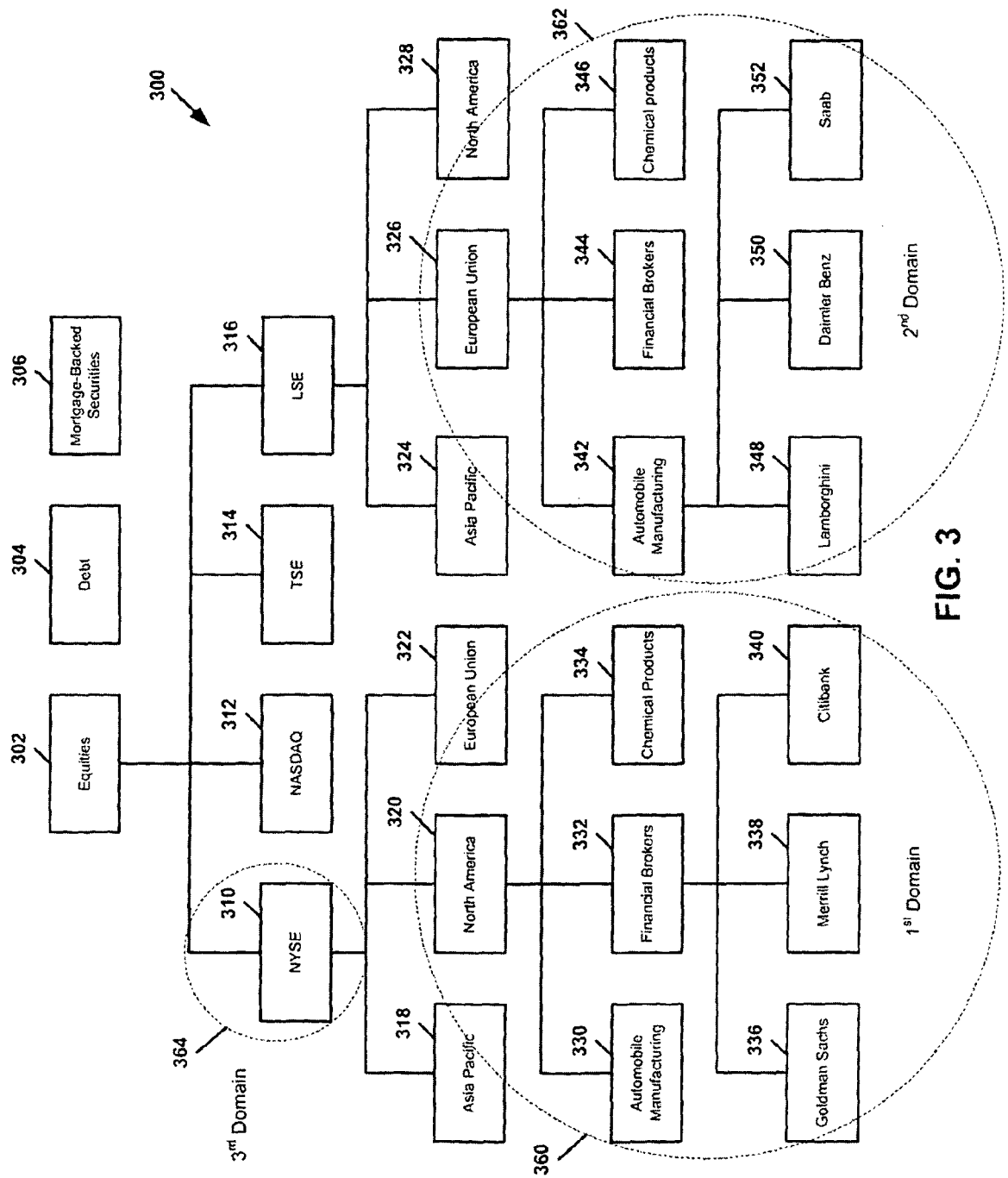
FIG. 3 is a block diagram of an illustrative embodiment of a hierarchical ontology data structure.

FIG. 1 is a block diagram of a particular embodiment of a system 100 to enable access to a subset of data. In the system 100, a client terminal 102 is coupled via a network 103 to aggregate subscription data, such as financial market data 104, and to an access manager 106. The aggregate financial market data 104 includes news 108, stock exchange data 110, and other data 112. In an illustrative embodiment, the other data 112 includes financial market data analysis data. In a particular embodiment, at least a portion of the aggregate financial market data 104 may be aggregated substantially in real-time. For example, the stock exchange data 110 may include stock quotes that are received from a stock exchange in real-time, i.e. within ten seconds of the corresponding stock having a particular price at a particular time. The aggregate financial market data 104 includes a subset of financial market data 122. In FIG. 1-3 financial market data is used to illustrate how a subscription to access a subset of data may be implemented. Alternative embodiments may be used to enable access to subsets of other types of data, such as accounting data, engineering data, healthcare data, science data, technology data, government data, other industry-related data, or any combination thereof.

The client terminal 102 includes a login manager 114, a financial application 116, an access manager runtime 118, and a local set of authorization databases 120. The client terminal 102 may be a computing device, such as a personal computer, a Bloomberg terminal, or a Reuters terminal. The login manager 114 is configured to send a login notification 150 to the access manager 106 after a user logs in at the client terminal 102. The access manager runtime 118 is configured to receive the local set of authorization databases 120 from the access manager 106 after the login manager 114 sends the login notification 150. The financial application 116 is configured to access the subset of financial market data 122 based on the local set of authorization databases 120.

The access manager 106 includes a network interface 130, a policy server 132, a directory services server 134, a set of authorization databases 136, and an ontology data structure 138. In a particular embodiment, the access manager 106 is implemented using Tivoli® Access Manager. The network interface 130 is configured to communicate with a remote computing device, such as the client terminal 102, via the network 103. The network interface 130 is further configured to receive the login notification 150, from the client terminal 102. The directory services server 134 includes a user information database 140 that includes user information associated with entitlements of each of a plurality of users to access a portion of the aggregate financial market data 104. The user information includes a user profile 142 that may include information that identifies a user subscription type. In a particular embodiment, the directory services server 134 is implemented via a lightweight directory access protocol (LDAP) server.

The policy server 132 is coupled to the directory services server 134 and includes a set of policies 144. The policy server 132 is configured to use the set of policies 144 to determine entitlements for a particular user, based on the user profile 142 of the particular user. The policy server 132 is further configured to identify a subset of authorization databases 156 of the set of authorization databases 136 based on the user entitlements and to define actions that the particular user is permitted to perform with respect to the subset of authorization databases 156. The access manager 106 is configured to replicate the subset of authorization databases 156 and send a replicated subset of authorization databases 158 to the client terminal 102 to enable the particular user to access the subset of financial market data 122.

The ontology data structure 138 is a representation of the aggregate financial market data 104. In a particular embodiment, the ontology data structure 138 is organized as a hierarchical tree structure, as illustrated in FIG. 3. The ontology data structure 138 may be partitioned into a plurality of domains 146 to create the set of authorization databases 136. The ontology data structure 138 may be logically partitioned based on at least one of a stock exchange, a financial instrument class, a financial instrument type, a symbol of a financial instrument, or a geographic classification, as discussed in more detail below. The plurality of domains 146 may be distinct from each other or at least two of the domains may overlap. Each authorization database of the set of authorization databases 136 is associated with a user subscription type. For example, when a domain is defined to include all automobile manufacturers having their headquarters in North America and listed on the New York Stock Exchange (NYSE), the authorization database corresponding to the defined domain enables a user to access the financial market data of all North American based automobile manufacturers listed on the NYSE by the appropriate type of subscription. In a particular embodiment, a first subset of the plurality of domains 160 is associated with the first subset of the authentication databases 156 and a second subset of the plurality of domains 162 is associated with a second subset of the authentication databases 164. In a particular embodiment, users are subdivided into groups of users and a user subscription type is associated with each group of users so that each user of a group has the same user subscription type and the same access privileges as other users of the group.

In operation, after a user log in, the login manager 114 sends the login notification 150 to the access manager 106. The login notification 150 is associated with a user of the client terminal 102. In response to the login notification 150, the policy server 132 sends a request for user information 152 to the directory services server 134. The directory services server 134 receives the request for user information 152, retrieves the user profile 142 from the user information database 140, and sends the user information 154 to the policy server 132. In an illustrative embodiment, the user information 154 that is sent to the policy server 132 includes the user profile 142.

The policy server 132 receives the user information 154 and identifies, based at least partially on the user profile 142, entitlement rights of the user to access the subset of financial market data 122. The policy server 132 identifies a first subset of authorization databases 156 of the set of authorization databases 136 based on the entitlement rights of the user and based on the set of policies 144. The first subset of authorization databases 156 includes at least one but not all databases in the set of authorization databases 136. Each of the authorization databases in the set of authorization databases 136 includes permissions to access a portion of the aggregate financial market data 104. For example, the first subset of authorization databases 156 may include permissions to access the subset of financial market data 122. The policy server 132 replicates the first subset of authorization databases 156 and sends the replicated subset of authorization databases 158 to the client terminal 102. The client terminal 102 receives and stores the replicated subset of authorization databases 158 at the local set of authorization databases 120.

When a user of the client terminal 102 attempts to access the subset of financial market data 122, the access manager runtime 118 determines whether the user is authorized to access the subset of financial market data 122 via the set of local authorization databases 120. For example, the set of local authorization databases 120 may include information related to user subscriptions to access portions of the aggregate financial market data 104. When the set of local authorization databases 120 indicates that the user of the client terminal 102 is authorized to access the subset of financial market data 122, then the user is granted access to the subset of financial market data 122. When the set of local authorization databases 120 indicates that the user of the client terminal 102 is not authorized to access the subset of financial market data 122, then the user is denied access to the subset of financial market data 122.

By replicating the first subset of authorization databases 156 and storing them at the set of local authorization databases 120 of the client terminal 102, the client terminal 102 can quickly determine which portions of the aggregate financial market data 104 a user is authorized to access. The client terminal 102 does not send messages to an external entity, such as a subscription enforcement gateway to the aggregate financial market data 104, to determine which portions of the aggregate financial market data 104 a user is authorized to access in response to every user request to access data. Nor does the client terminal 102 periodically synchronize the local set of authorization databases 120 with the entire set of authorization databases 136 because the replicated subset of authorization databases 158 are replicated based on the user profile 142. Instead, when a user changes his or her subscription to access a portion of the aggregate financial market data 104, the client terminal 102 may periodically receive a new authorization database or an updated replicated subset of authorization databases 158.

FIG. 2 is a block diagram of a second embodiment of a system 200 to enable access to a subset of data. The system 200 includes a first client terminal 202, a second client terminal 204, and a third client terminal 206, each coupled to a network 208. The network 208 is also coupled to aggregate financial market data 210 and to an access manager 212.

The first client terminal 202 includes a first set of local authorization databases 214. The second client terminal 204 includes a second set of local authorization databases 216. The third client terminal 206 includes a third set of local authorization databases 218. The access manager 212 includes a policy server 220, a set of authorization databases 222, an ontology data structure 224, and a profile database 226. In the embodiment shown, the profile database 226 includes a first user profile 228, a second user profile 230, and a third user profile 232. The aggregate financial market data 210 includes a first subset of financial market data 234, a second subset of financial market data 236, and a third subset of financial market data 238. The first subset of financial market data 234 and the second subset of financial market data 236 have an overlap 240.

The first client terminal 202 is configured to send a first login notification 242 to the access manager 212 when a first user logs in. The first client terminal 202 is further configured to receive a first replicated subset of authorization databases 248 from the access manager 212. The second client terminal 204 is configured to send a second login notification 244 to the access manager 212 when a second user logs in. The second client terminal 204 is further configured to receive a second replicated subset of authorization databases 250 from the access manager 212. The third client terminal 206 is configured to send a third login notification 246 to the access manager 212 when a third user logs in. The third client terminal 206 is further configured to receive a third replicated subset of authorization databases 252 from the access manager 212.

The access manager 212 is configured to receive the login notifications 242, 244, and 246 from the client terminals 202, 204, and 206, respectively. The access manager 212 is further configured to identify a subset of the set of authorization databases 222 based on the user profiles 228, 230, and 232 and to send the subset of replicated authorization databases 248, 250, and 252 to the client terminals 202, 204, and 206, respectively.

In operation, when a first user logs in to the first client terminal 202, the access manager 212 receives the first login notification 242 from the first client terminal 202. The access manager 212 looks up the first user profile 228 in the profile database 226 and identifies a subset of the set of authorization databases 222 based on the first user profile 228. The access manager 212 replicates and sends the first replicated subset of authorization databases 248 to the first client terminal 202. The first client terminal 202 stores the first replicated subset of authorization databases 248 at the first set of local authorization databases 214. When the first user attempts to access a portion of the aggregate financial market data 210, the first set of local authorization databases 214 are used to determine that the first user can access the first subset of financial market data 234.

When a second user logs in to the second client terminal 204, the access manager 212 receives the second login notification 244 from the second client terminal 204. The access manager 212 looks up the second user profile 230 in the profile database 226 and identifies a subset of the set of authorization databases 222 based on the second user profile 230. The access manager 212 replicates and sends the second replicated subset of authorization databases 250 to the second client terminal 204. In a particular embodiment, replicating the second replicated subset of authorization databases 250 is performed substantially simultaneously with replicating the first replicated subset of authorization databases 248. The second client terminal 204 stores the second replicated subset of authorization databases 250 at the second set of local authorization databases 216. When the second user attempts to access a portion of the aggregate financial market data 210, the second set of local authorization databases 216 are used to determine that the second user can access the second subset of financial market data 236.

When a third user logs in to the third client terminal 206, the access manager 212 receives the third login notification 246 from the third client terminal 206. The access manager 212 looks up the third user profile 232 in the profile database 226 and identifies a subset of the set of authorization databases 222 based on the third user profile 232. The access manager 212 replicates and sends the third replicated subset of authorization databases 252 to the third client terminal 206. In a particular embodiment, replicating the third replicated subset of authorization databases 252 is performed substantially simultaneously with replicating the first replicated subset of authorization databases 248. The third client terminal 206 stores the third replicated subset of authorization databases 252 at the third set of local authorization databases 218. When the third user attempts to access a portion of the aggregate financial market data 210, the third set of local authorization databases 218 are used to determine that the third user can access the third subset of financial market data 238.

By identifying a subset of the set of authorization databases 222 based on a particular user profile in the profile database 226 and replicating and storing the subset of authorization databases locally at a client terminal, the client terminals 202, 204, and 206 can quickly and easily determine which portions of the aggregate financial market data 210 a particular user can access. The subset of the set of authorization databases 222 are selectively replicated and stored when a user logs in and before the user requests access to a portion of the aggregate financial market data 210. The client terminals 202, 204, and 206 can determine which of the subsets of financial market data 234, 236, and 238 the user can access without having to send messages to an external entity for every user request to access data and without having to store a copy of the entire set of authorization databases 222 locally. The sets of local authorization databases 214, 216, and 218 are each smaller than the set of authorization databases 222 because the sets of local authorization databases 214, 216, and 218 are selectively replicated based on a user profile in the profile database 226 and therefore customized for each user. When a user purchases a new subscription to a portion of the aggregate financial market data 210, or When the subscription data content changes, the access manager 212 selectively replicates and sends a new authorization database to the user's client terminal to enable the user to access the financial market data associated with the new subscription. Thus, the subset of local authorization databases 214, 216, and 218 can be quickly and easily changed to reflect each user's current subscriptions to financial market data.

FIG. 3 is a block diagram of an illustrative embodiment of a hierarchical ontology data structure 300. The hierarchical ontology data structure 300 includes the financial instruments equities 302, debt 304, and mortgage-hacked securities 306. The equity instruments 302 include the stock exchanges New York Stock Exchange (NYSE) 310, National Association of Securities Dealers Automated Quotation (NASDAQ) 312, Toronto Stock Exchange (TSE) 314, and London Stock Exchange (LSE) 316. The NYSE 310 includes the geographic areas Asia Pacific 318, North America 320, and European Union 322. The LSE 316 includes the geographic areas Asia Pacific 324, European Union 326, and North America 328.

The geographic area North America 320 of the NYSE 310 includes the industries automobile manufacturing 330, financial brokers 332, and chemical products 334. The financial brokers 332 include the companies Goldman Sachs 336, Merrill Lynch 338, and Citibank 340.

The geographic area European Union 326 of the LSE 316 includes the industries automobile manufacturing 342, financial brokers 344, and chemical products 346. The automobile manufacturing 342 includes the manufacturers Lamborghini 348, Daimler 350, and Saab 352.

A first domain 360 includes the automobile manufacturing 330, the financial brokers 332, and the chemical products 334 in North America listed as equities on the New York Stock Exchange. A second domain 362 includes the automobile manufacturers 342, the financial brokers 344, and the chemical products 346 in the European Union listed as equities on the London Stock Exchange. A third domain 364 includes all equities listed on the New York Stock Exchange.

A financial market data aggregator creates the hierarchical ontology data structure 300 and defines the domains 360, 362, and 364. Each domain corresponds to a portion of the aggregate financial market data that may be accessed via a subscription. Each domain has a corresponding authorization database (not shown). The hierarchical ontology data structure of FIG. 3 is an example of how a hierarchical ontology data structure may be organized and divided into domains. Each of the domains 360, 362, and 364 may be distinct or they may overlap.

Figure 4:
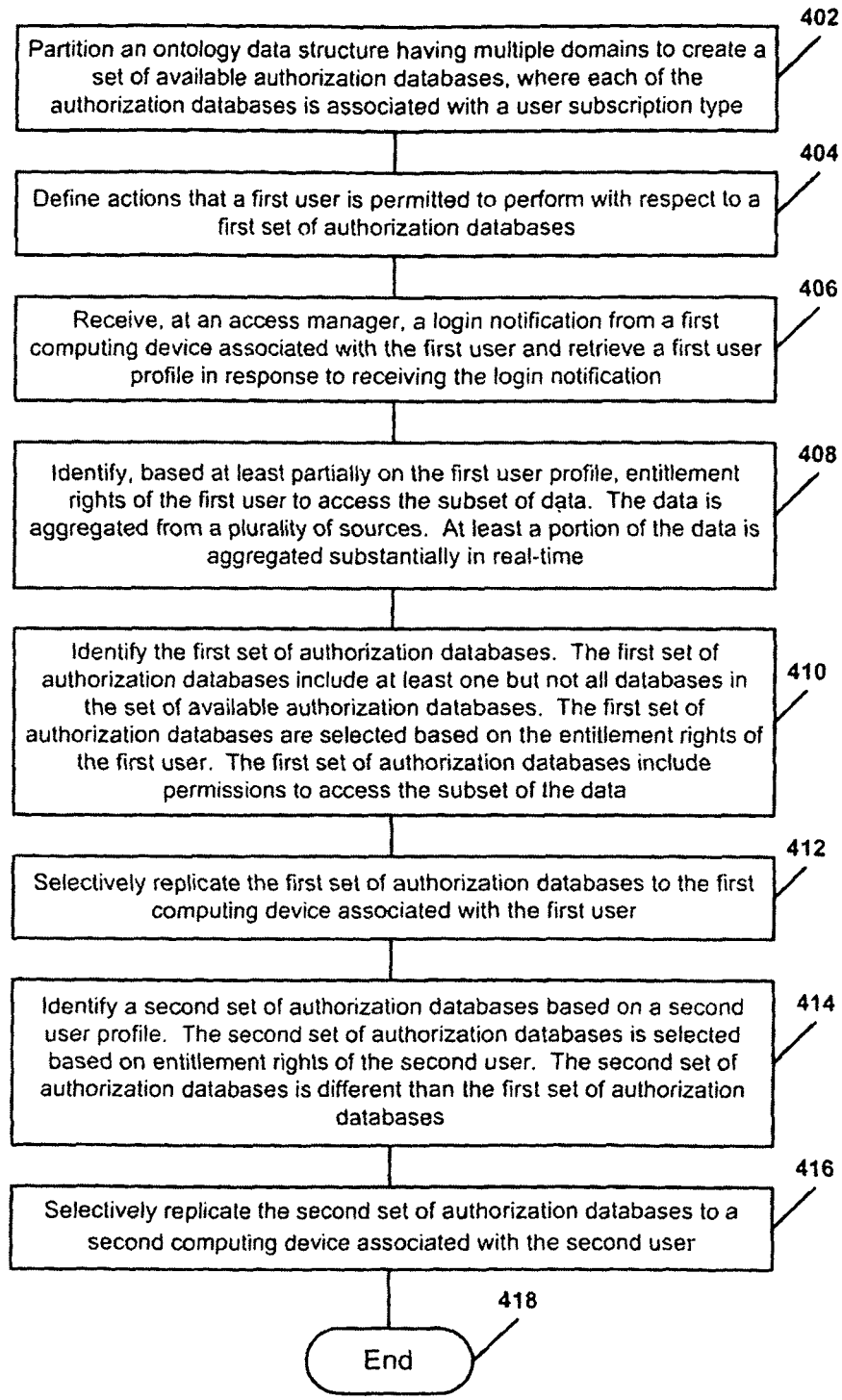
FIG. 4 is a flow diagram of a first illustrative embodiment of a method to enable access to a subset of data.

FIG. 4 is a flow diagram of a first illustrative embodiment of a method to enable access to a subset of data. The method may be performed by a policy server, such as the policy server 132, as shown in FIG. 1.

At 402, an ontology data structure having multiple domains is partitioned to create a set of authorization databases, where each of the authorization databases is associated with a user subscription type. For example, in FIG. 1, the ontology data structure 138 has multiple domains 146 and is partitioned to create the set of authorization databases 136. Proceeding to 404, actions that a first user is permitted to perform with respect to a first set of authorization databases are defined. For example, the first user may be permitted to view data but may not be permitted to analyze the data.

Continuing to 406, a login notification is received at an access manager from a first computing device associated with the first user and a first user profile is retrieved in response to receiving the login notification. For example, in FIG. 2, the policy server 220 receives the first login notification 242 from the first client terminal 202 and retrieves the first user profile 228 in response to receiving the first login notification 242. Advancing to 408, entitlement rights of the first user to access the subset of financial market data are identified based at least partially on the first user profile. The data is aggregated from a plurality of sources. At least a portion of the data is aggregated substantially in real-time. For example, in FIG. 1, the entitlements rights of the user may be identified based at least partially on the user profile 142 and based at least partially on the set of policies 144.

Moving to 410, the first set of authorization databases is identified. For example, in FIG. 1, the policy server 132 identifies the first subset of authorization databases 156. The first set of authorization databases identified at 410 includes at least one but not all databases in the set of authorization databases. The first set of authorization databases is selected based on the entitlement rights of the first user. The first set of authorization databases includes permissions to access the subset of the data. For example, in FIG. 1, the first subset of authorization databases 156 may include permissions to access the subset of financial market data 122. In a particular embodiment, a first subset of the plurality of domains is associated with a second subset of the authentication databases and a third subset of the plurality of domains is associated with a fourth subset of the authentication databases.

Proceeding to 412, the first set of authorization databases is selectively replicated to the first computing device associated with the first user. For example, in FIG. 2, the first replicated subset of authorization databases 248 may be replicated to the first client terminal 202 to enable a user of the first client terminal 202 to access the first subset of financial market data 234. Continuing to 414, a second set of authorization databases is identified based on a second user profile. The second set of authorization databases is selected based on entitlement rights of the second user. The second set of authorization databases is different than the first set of authorization databases. Advancing to 416, the second set of authorization databases is selectively replicated to a second computing device associated with the second user. For example, in FIG. 2, the second replicated subset of authorization databases 250 may be replicated to the second client terminal 204 to enable a user of the second client terminal 204 to access the second subset of financial market data 236. The second subset of authorization databases may be replicated substantially simultaneously with replicating the first subset of authorization databases. The method ends, at 418.

Figure 5:
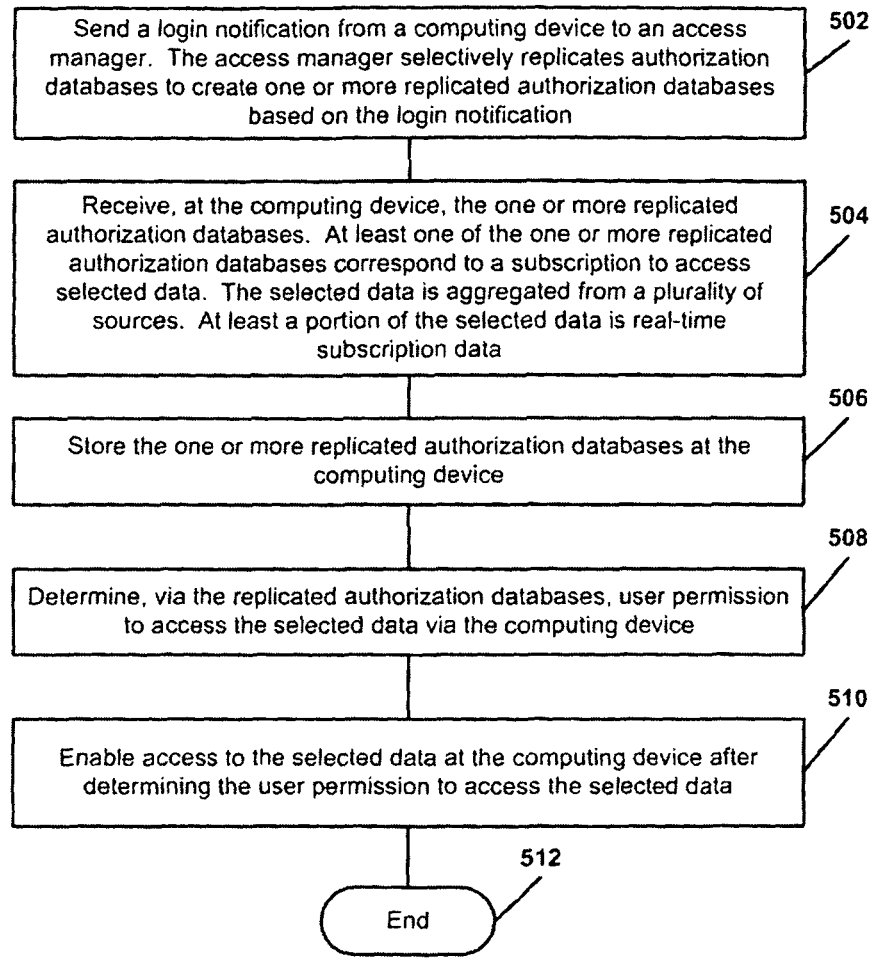
FIG. 5 is a flow diagram of a second illustrative embodiment of a method to enable access to a subset of data.

FIG. 5 is a flow diagram of a second illustrative embodiment of a method to enable access to a subset of financial market data. The method may be performed by a computing device, such as the client terminal 102, as shown in FIG. 1.

At 502, a login notification is sent from a computing device to an access manager. The access manager selectively replicates authorization databases to create one or more replicated authorization databases based on the login notification. For example, in FIG. 1, the access manager 106 identifies the first subset of authorization databases 156 based on the login notification 150 and selectively replicates the set of authorization databases 136 to create the replicated subset of authorization databases 158. Proceeding to 504, the one or more replicated authorization databases are received at the computing device. At least one of the one or more replicated authorization databases correspond to a subscription to access selected financial market data. For example, in FIG. 1, the replicated subset of authorization databases 158 corresponds to a subscription to access the subset of financial market data 122. Continuing to 506, the one or more replicated authorization databases are stored at the computing device. For example, in FIG. 1, the replicated subset of authorization databases 150 is stored at the local set of authorization databases 120. Advancing to 508, user permission to access the selected data via the computing device is determined via the replicated authorization databases. For example, in FIG. 1 when a user attempts to access the subset of financial market data 122 via the client terminal 102, the access manager runtime 118 determines whether the user is authorized to access the subset of financial market data 122 via the local set of authorization databases 120. Moving to 510, access to the selected data is enabled at the computing device after determining the user permission to access the selected financial market data. For example, in FIG. 1, after determining the user permission to access the subset of financial market data 122 via the local set of authorization databases 120, the access manager runtime 118 either grants or denies the user's request to access the subset of financial market data 122. The method ends at 512.

Figure 6:
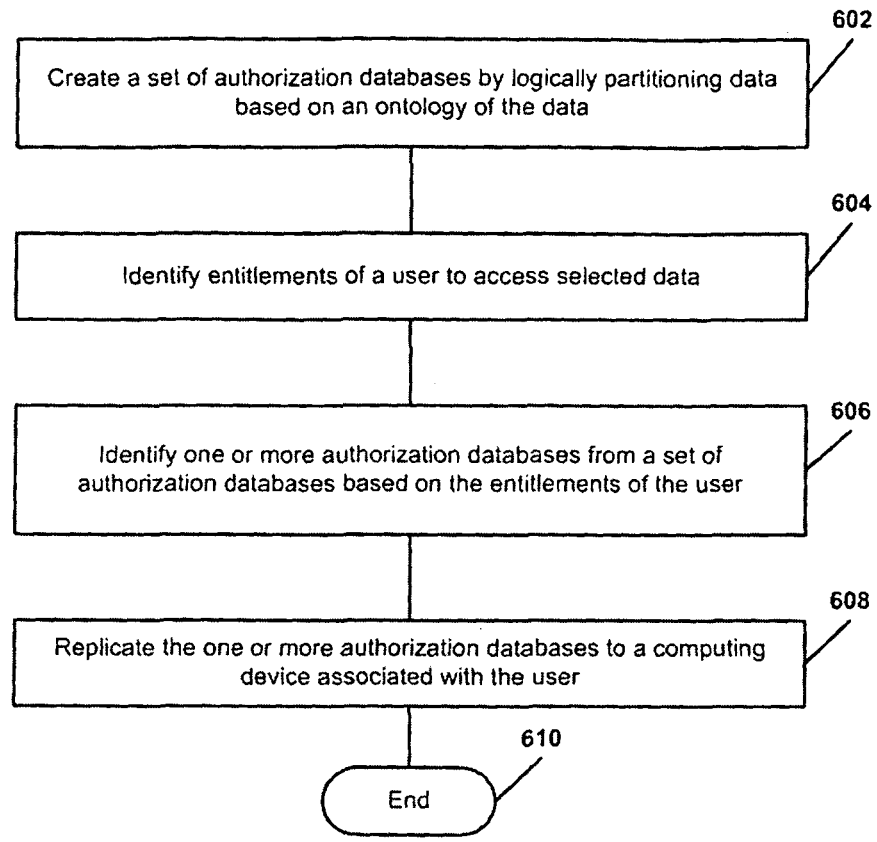
FIG. 6 is a flow diagram of a third illustrative embodiment of a method to enable access to a subset of data.

FIG. 6 is a flow diagram of a third illustrative embodiment of a method to enable access to a subset of data. The method may be performed by a policy server, such as the policy server 132, as shown in FIG. 1.

At 602, a set of authorization databases is created by logically partitioning financial market data based on an ontology of the data. For example, in FIG. 3, the ontology data structure 300 is logically partitioned into the domains 360, 362, and 364. Proceeding to 604, entitlements of a user to access selected data are identified. For example, in FIG. 1, the user entitlements may be determined by retrieving the user profile 142 from the user information database 140 of the directory services server 134. Continuing to 606, one or more authorization databases are identified from a set of authorization databases based on the entitlements of the user. For example, in FIG. 1, the first subset of authorization databases 156 may be identified from the set of authorization databases 136 based on the user profile 142. Advancing to 608, the one or more authorization databases are replicated to a computing device associated with the user. For example, in FIG. 1, the subset of authorization databases 158 may be replicated to the local set of authorization databases 120. The method ends at 610.

Figure 7:
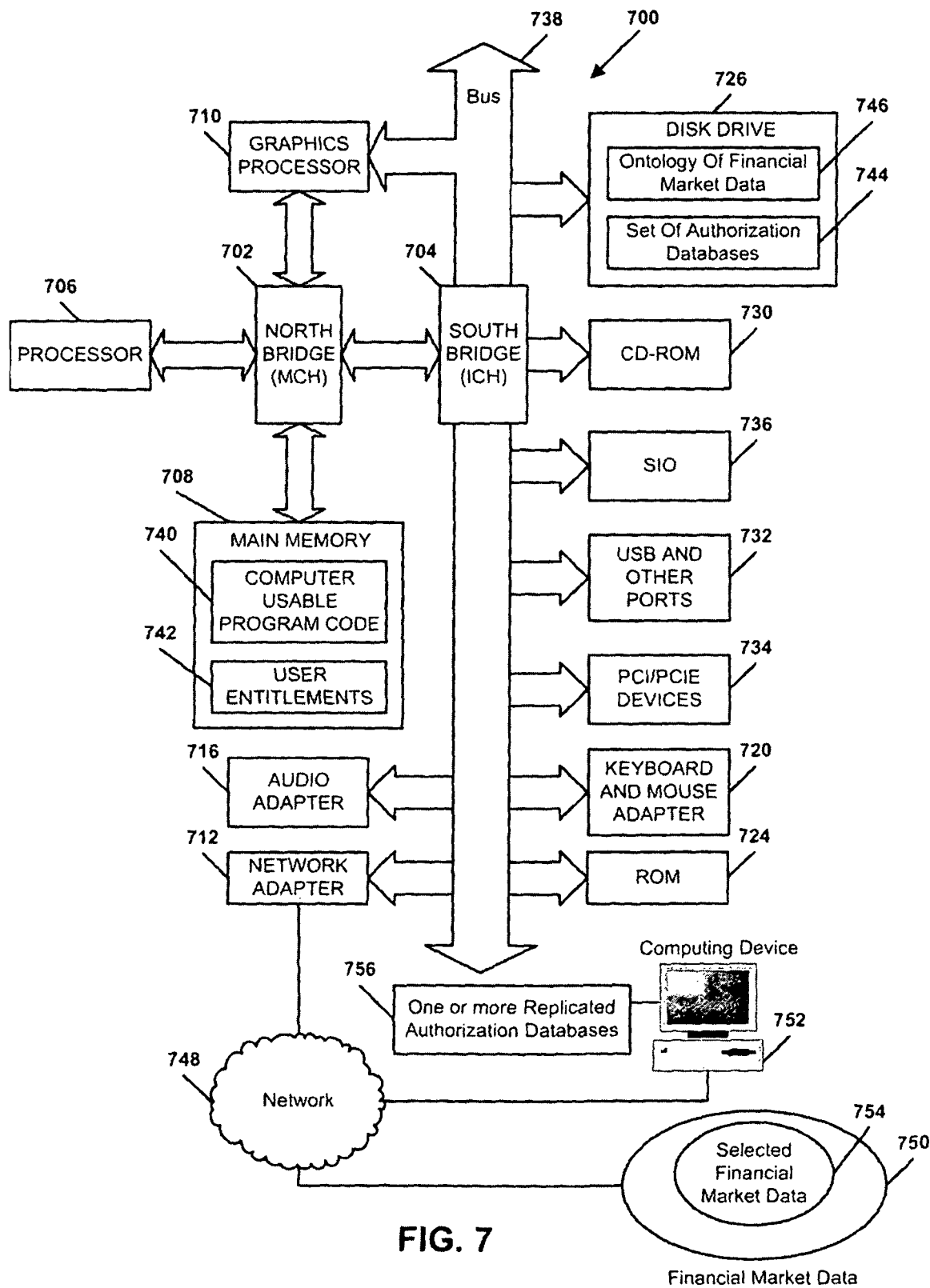
FIG. 7 is a general diagram of a computing system.

FIG. 7 is a general diagram of a computing system 700 in which systems and methods of the present disclosure may be implemented. In the depicted example, the computing system 700 employs a hub architecture including a north bridge and memory controller hub (MCH) 702 and a south bridge and input/output (I/O) controller hub (ICH) 704. A processor 706, a main memory 708, and a graphics processor 710 are coupled to the north bridge and memory controller hub 702. For example, the graphics processor 710 may be coupled to the MCH 702 through an accelerated graphics port (AGP) (not shown).

In the depicted example, a network adapter 712 is coupled to the south bridge and I/O controller hub 704 and an audio adapter 716, a keyboard and mouse adapter 720, a read only memory (ROM) 724, universal serial bus (USB) ports and other communications ports 732, and Peripheral Component Interconnect (PCI) and Peripheral Component Interconnect Express (PCIe) devices 734 are coupled to the south bridge and I/O controller hub 704 via bus 738. A disk drive 726 and a CD-ROM drive 730 are coupled to the south bridge and I/O controller hub 704 through the bus 738. The PCI/PCIe devices 734 may include, for example, Ethernet adapters, add-in cards, and PC cards for notebook computers. The ROM 724 may be, for example, a flash binary input/output system (BIOS). The disk drive 726 and the CD-ROM drive 730 may use, for example, an integrated drive electronics (IDE) or serial advanced technology attachment (SATA) interface. A super I/O (SIO) device 736 may be coupled to the south bridge and I/O controller hub 704.

The main memory 708 includes computer instructions installed onto a computer readable medium that includes computer usable program code 740. The main memory 708 also includes user entitlements 742. The disk drive 726 includes a set of authorization databases 744 and an ontology of financial market data 746. The network adapter 712 is coupled to a remote computing device 752, such as the client terminal 102, as shown in FIG. 1. The network adapter 712 is also coupled to financial market data 750 that includes selected financial market data 754.

The computer usable program code 740 is configured to create the set of authorization databases 744 by logically partitioning financial market data 750 based on the ontology of the financial market data 746. The ontology of the financial market data 716 is logically partitioned based on at least one of a stock exchange, a financial instrument class, a financial instrument type, a symbol of a financial instrument, and a geographic classification.

The computer usable program code 740 is further configured to identify user entitlements 742 to access the selected financial market data 754. The computer usable program code 740 is further configured to identify one or more authorization databases from the set of authorization databases 744 based on the user entitlements 742. The computer usable program code 740 is further configured to replicate the one or more authorization databases to create the one or more replicated authorization databases 756 at the computing device 752 associated with the user.

An operating system (not shown) runs on the processor 706 and coordinates and provides control of various components within the computing system 700. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provide calls to the operating system from Java programs or applications executing on the computing system 700 (Java and all Java-based trademarks are trademarks of Sun Microsystems, Inc. in the United States, other countries, or both).

Instructions for the operating system, the object-oriented programming system, and applications or programs are located on storage devices, such as the disk drive 726, and may be loaded into the main memory 708 for execution by the processor 706. The processes of the disclosed illustrative embodiments may be performed by the processor 706 using computer implemented instructions, which may be located in a memory such as, for example, the main memory 708, the read only memory 724, or in one or more of the peripheral devices.

The hardware in computing system 700 may vary depending on the implementation. Other internal hardware or peripheral devices, such as flash memory, equivalent non-volatile memory, or optical disk drives and the like, may be used in addition to or in place of the hardware depicted in FIG. 7. Also, the processes of the disclosed illustrative embodiments may be applied to a multiprocessor data processing system.

In some illustrative examples, portions of the computing system 700 may be implemented in a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, the main memory 708 or a cache such as found in the north bridge and memory controller hub 702. A processing unit may include one or more processors or CPUs. The depicted examples in FIG. 7 and above-described examples are not meant to imply architectural limitations. For example, portions of the computing system 700 also may be implemented in a personal computer, server, server cluster, tablet computer, laptop computer, or telephone device in addition to taking the form of a PDA.

Particular embodiments of the computing system 700 can take the form of an entirely hardware embodiment, an entirely software embodiment or an embodiment containing both hardware and software elements. In a particular embodiment, the disclosed methods are implemented in software that is embedded in processor readable medium and executed by a processor, which includes but is not limited to firmware, resident software, microcode, etc.

Further, embodiments of the present disclosure, such as the one or more embodiments in FIGS. 1-7 can take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semi-conductor system (or apparatus or device) or a propagation medium. Examples of a computer-readable medium include a semiconductor Or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method, comprising:
   partitioning an ontology data structure having multiple domains to create a set of authorization databases, wherein each of the authorization databases is associated with a user subscription type;
   identifying, based at least partially on a first user profile, entitlement rights of a first user to access a subset of data, the data aggregated from a plurality of sources, wherein at least a portion of the data is aggregated substantially in real-time;
   identifying a first subset of authorization databases, the first subset of authorization databases including at least one but not all databases in the set of authorization databases, the first subset of authorization databases selected based on a subscription associated with the first user, wherein the first subset of authorization databases includes permissions to access the subset of data; and
   selectively replicating the first subset of authorization databases to a first computing device associated with the first user, wherein the replicated first subset of authorization databases includes the permissions to access the subset of data.

2. The method of claim 1, wherein the first user profile includes information that identifies the user subscription type.

3. The method of claim 1, further comprising receiving, at an access manager, a login notification from the computing device associated with the first user and retrieving the first user profile in response to receiving the login notification.

4. The method of claim 3, further comprising:
   identifying a second subset of authorization databases based on a second user profile, the second subset of authorization databases selected based on a second subscription associated with the second user, wherein the second subset of authorization databases is different than the first subset of authorization databases; and
   selectively replicating the second subset of authorization databases to a second computing device associated with the second user.

5. The method of claim 4, wherein at least one authorization database is in the first subset of authorization databases and in the second subset of authorization databases.

6. The method of claim 4, wherein selectively replicating the second subset of authorization databases is performed substantially simultaneously with selectively replicating the first subset of authorization databases.

7. A system to enable access to a subset of data, the system comprising:
- a network interface configured to communicate with a remote computing device via a network, the network interface to receive a login notification from a computing device associated with a user,
- a directory services server including user information associated with entitlements of each of a plurality of users to access a subset of data, the data including subscription data from a plurality of data sources, wherein the user information includes a user profile;
- a policy server coupled to the directory services server, the policy server including a set of policies useable to determine entitlements for a particular user based on a user profile of the particular user, the policy server configured to identify a subset of authorization databases from a set of authorization databases based on the entitlements, wherein each of the authorization databases is associated with a user subscription type; and
- an access manager configured to selectively replicate the subset of authorization databases to the remote computing device to enable user access of the particular user to the subset of the data, wherein the subset of authorization databases includes permissions to access the subset of data.

8. The system of claim 7, wherein the set of authorization databases are created by partitioning an ontology data structure representation of the data.

9. The system of claim 8, wherein the ontology data structure includes a hierarchical tree structure that is logically partitioned into a plurality of domains.

10. The system of claim 9, wherein a first subset of the plurality of domains is associated with a second subset of the authentication databases and a third subset of the plurality of domains is associated with a fourth subset of the authentication databases.

11. A computer program product comprising a tangible computer usable storage device having computer usable program code stored thereon, the computer usable program code comprising:
- computer usable program code configured to identify entitlements of a user to access selected data, the selected data including subscription data collected from a plurality of sources;
- computer usable program code configured to identify one or more authorization databases from a set of authorization databases based on the entitlements of the user, wherein each of the authorization databases is associated with a user subscription type; and
- computer usable program code configured to selectively replicate the one or more authorization databases to a computing device associated with the user based on the entitlements of the user to access the selected data, wherein the one or more authorization databases includes permissions to access the selected data.

12. The computer program product of claim 11, further comprising computer usable program code configured to aggregate the data collected from the plurality of sources substantially in real-time.

13. The computer program product of claim 11, wherein the computer usage program code configured to selectively replicate the one or more authorization databases is configured to selectively replicate the one or more databases in response to a login notification received from the computing device.

* * * * *